(12) United States Patent
Milster et al.

(10) Patent No.: US 12,372,924 B2
(45) Date of Patent: Jul. 29, 2025

(54) COMPLEX DIVERSITY FOR ACCURATE PHASE RETRIEVAL WITH SINGLE SHOT ACQUISITION

(71) Applicant: Arizona Board of Regents on Behalf of the University of Arizona, Tucson, AZ (US)

(72) Inventors: Thomas D. Milster, Tucson, AZ (US); Akira Eguchi, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 463 days.

(21) Appl. No.: 17/627,188

(22) PCT Filed: Jul. 15, 2020

(86) PCT No.: PCT/US2020/042112
§ 371 (c)(1),
(2) Date: Jan. 14, 2022

(87) PCT Pub. No.: WO2021/011637
PCT Pub. Date: Jan. 21, 2021

(65) Prior Publication Data
US 2022/0365484 A1 Nov. 17, 2022

Related U.S. Application Data

(60) Provisional application No. 62/874,208, filed on Jul. 15, 2019.

(51) Int. Cl.
*G03H 1/16* (2006.01)
*G01B 9/021* (2006.01)
(Continued)

(52) U.S. Cl.
CPC ............... *G03H 1/16* (2013.01); *G01B 9/021* (2013.01); *G01M 11/0242* (2013.01); *G03H 1/2294* (2013.01); *G02F 2203/18* (2013.01)

(58) Field of Classification Search
CPC ...... G03H 1/2294; G03H 1/0808; G03H 1/08; G03H 1/2205; G03H 1/0005;
(Continued)

(56) References Cited

U.S. PATENT DOCUMENTS 6,356,345 B1 * 3/2002 McArthur ................. G01J 9/00
356/121
6,545,790 B2 * 4/2003 Gerchberg ............. G02B 27/46
359/279
(Continued)

FOREIGN PATENT DOCUMENTS

| CN | 102084298 A | * | 6/2011 | ......... G03F 7/70075 |
| EP | 3260841 A1 | * | 12/2017 | ......... G01N 15/0227 |

(Continued)

OTHER PUBLICATIONS

International Search Report for PCT/US2020/042112 mailed Jul. 15, 2020.

*Primary Examiner* — Michael P Stafira
(74) *Attorney, Agent, or Firm* — Thomas | Horstemeyer, LLP

(57) ABSTRACT

A new diversity concept is provided for achieving accurate phase retrieval with a single shot acquisition. Multiple irradiance data are obtained by a diffractive grating or CGH designed to generate multiple diffraction orders with different diversity values. The effective filters associated with the individual diffraction orders from the diffractive grating or CGH are calculated. The effective filters are extracted by numerical propagation, and they preferably include both real and imaginary values, which signify both absorption and phase shift versus position in the filter plane. The recon-
(Continued)

struction process utilizes accurate knowledge of the effective filters for each diffraction order for high quality reconstruction of the extrinsic phase.

18 Claims, 10 Drawing Sheets

(51) Int. Cl.
    *G01M 11/02*     (2006.01)
    *G03H 1/22*     (2006.01)

(58) Field of Classification Search
CPC ........ G03H 2210/30; G03H 1/22; G03H 1/02; G03H 2001/0224; G03H 1/2286; G03H 2226/05; G03H 1/2249; G03H 2225/32; G03H 2001/2271; G03H 2001/2242; G03H 2001/221; G03H 2226/02; G03H 2001/0816; G03H 1/32; G03H 2210/20; G03H 2001/2297; G03H 2222/34; G03H 1/04; G03H 1/0244; G03H 1/0891; G03H 2001/0825; G03H 2223/16; G03H 2225/60; G03H 1/0841; G03H 1/16; G03H 1/26; G03H 2001/303; G03H 2001/2292; G03H 2210/454; G03H 2001/2284; G03H 1/0011; G03H 2223/19; G03H 1/268; G03H 2001/0088; G03H 2001/2236; G03H 2001/085; G03H 1/0443; G03H 1/30; G03H 1/2202; G03H 2225/22; G03H 2001/2263; G03H 2001/2218; G03H 1/265; G03H 2001/0858; G03H 2001/2239; G03H 2225/52; G03H 2210/441; G03H 2222/18; G03H 2225/55; G03H 2210/452; G03H 2001/306; G03H 2223/23; G03H 2223/24; G03H 2001/0216; G03H 2001/0833; G03H 2223/12; G03H 2225/33; G03H 2001/2231; G03H 1/0866; G03H 1/0248; G03H 2222/22; G03H 2210/33; G03H 2210/36; G03H 2225/61; G03H 2001/0212; G03H 2240/51; G03H 2225/12; G03H 2227/02; G03H 2001/2207; G03H 2001/2234; G03H 2222/36; G03H 2223/18; G03H 2223/17; G03H 2001/2244; G03H 2001/0439; G03H 2227/03; G03H 2001/266; G03H 2222/31; G03H 2225/25; G03H 2001/2655; G03H 2223/14; G03H 2240/61; G03H 2240/13; G03H 2240/62; G03H 1/12; G03H 2001/2215; G03H 2001/0016; G03H 2240/41; G03H 2270/55; G03H 1/00; G03H 2226/04; G03H 2225/31; G03H 1/28; G03H 2001/0415; G03H 2001/2223; G03H 2240/56; G03H 2001/0094; G03H 2001/0478; G03H 1/0402; G03H 1/2645; G03H 1/0236; G03H 2222/35; G03H 2223/20; G03H 2222/33; G03H 2222/20; G03H 2222/12; G03H 2001/261; G03H 2222/16; G03H 2001/0413; G03H 2001/2247; G03H 2001/262; G03H 2001/0033; G03H 1/0486; G03H 2240/42; G03H 2001/225; G03H 2222/24; G03H 2001/264; G03H 2210/45; G03H 2225/35; G03H 2223/13; G03H 2001/2221; G03H 2001/0204; G03H 2250/36; G03H 1/24; G03H 2001/2273; G03H 2210/44; G03H 2001/226; G03H 1/041; G03H 2001/0077; G03H 2001/048; G03H 2001/045; G03H 2001/2605; G03H 2223/55; G03H 1/028; G03H 2001/269; G03H 2210/40; G03H 2222/13; G03H 2001/2276; G03H 2001/2615; G03H 2210/32; G03H 2210/55; G03H 2001/2226; G03H 2225/24; G03H 2227/05; G03H 1/0476; G03H 2001/0066; G03H 2001/005; G03H 2210/22; G03H 1/202; G03H 1/20; G03H 2001/0491; G03H 1/0408; G03H 2260/63; G03H 2001/2625; G03H 2210/52; G03H 1/0256; G03H 2240/55; G03H 2223/15; G03H 2210/54; G03H 2223/21; G03H 2270/21; G03H 2225/30; G03H 1/06; G03H 2001/0883; G03H 2210/56; G03H 2001/0061; G03H 2230/10; G03H 2270/52; G03H 2210/42; G03H 2260/62; G03H 2001/2252; G03H 2222/17; G03H 2225/34; G03H 1/0406; G03H 2210/53; G03H 2223/22; G03H 2224/04; G03H 1/0252; G03H 2001/0072; G03H 2260/12; G03H 2222/46; G03H 2001/207; G03H 2250/10; G03H 2226/11; G03H 2001/043; G03H 2001/2213; G03H 2222/52; G03H 2227/06; G03H 2001/0428; G03H 2001/0447; G03H 2001/2635; G03H 2250/42; G03H 2001/0458; G03H 2225/00; G03H 2240/11; G03H 2240/23; G03H 2260/51; G03H 2001/0452; G03H 2001/0445; G03H 2001/0482; G03H 2226/13; G03H 2240/15; G03H 2240/43; G03H 2222/53; G03H 2223/26; G03H 5/00; G03H 2001/0055; G03H 2240/24; G03H 2001/0038; G03H 2222/54; G03H 2001/0421; G03H 1/18; G03H 2260/14; G03H 2001/2289; G03H 2222/23; G03H 2250/38; G03H 2001/0232; G03H 1/10; G03H 2001/0022; G03H 2001/0497; G03H 2223/54; G03H 2001/0426; G03H 2001/187; G03H 2210/62; G03H 1/0465; G03H 2225/11; G03H 2001/0284; G03H 2225/36; G03H 2210/13; G03H 1/0276; G03H 2223/50; G03H 2001/026; G03H 2240/50; G03H 2270/22; G03H 2001/2228; G03H 2240/12; G03H 2001/188; G03H 2001/2281; G03H 2001/0264; G03H 2001/0296; G03H 2001/0423; G03H 2001/2675; G03H 2225/21; G03H 2001/0473; G03H 2250/33; G03H 2225/10; G03H 2270/32; G03H 3/00; G03H 1/0272; G03H 1/0404; G03H 2001/0268; G03H 2001/186; G03H 2210/12; G03H 2222/14; G03H 2001/0484; G03H 2225/23; G03H 2240/52; G03H 2210/11; G03H 2225/13; G03H 2240/21; G03H 2250/40; G03H 2270/12; G03H 1/182; G03H 2001/0228; G03H 2001/0288; G03H 2240/53; G03H 2250/34; G03H 2250/39; G03H 1/024; G03H 2222/42; G03H 2223/53; G03H 2270/23; G03H 2270/54; G03H 2001/0454; G03H 2222/15; G03H 1/14; G03H 2001/0441; G03H 2001/205; G03H 2223/25; G03H 2260/35; G03H 2260/53; G03H 2222/10; G03H 2250/44; G03H 1/0493; G03H 2001/0434; G03H 2001/2257; G03H 2270/13; G03H 2001/263; G03H 2270/11; G03H 2001/0495; G03H 2001/2265; G03H 2210/63; G03H 2001/0471; G03H 2250/43; G03H 2001/185; G03H 2001/2685; G03H 2222/32; G03H 2001/0083; G03H 2001/0417; G03H 2001/0469; G03H 2222/56; G03H 2225/20; G03H 2240/22; G03H 2001/0027; G03H 2001/0292; G03H 2210/10; G03H 2260/33; G03H 2001/0436; G03H 2210/562; G03H 2224/06; G03H 2001/0419; G03H 2001/2695; G03H 2222/50; G03H 2250/37; G03H 2270/24; G03H 1/34; G03H 2001/0875; G03H 2222/47; G03H 2240/26; G03H 2240/54; G03H 2250/12; G03H 2222/44; G03H 2270/31; G03H 2001/0456; G03H 2001/046; G03H 2222/43; G03H 2224/00; G03H 2240/40; G03H 2250/14; G03H 1/181; G03H 2001/0467; G03H 2210/46; G03H 2223/00; G03H 2224/02; G03H 2227/00; G03H 2260/00; G03H 2260/54; G03H 2001/022; G03H 2250/35; G03H 2250/41; G03H 2260/36; G03H 2260/52; G03H 2260/61; G03H 2001/0208; G03H 2001/184; G03H 2226/00; G03H 2227/04; G03H 2240/10; G03H 2260/16; G03H 2270/20; G03H 2222/00; G03H 2223/52; G03H 2260/31; G03H 2001/183; G03H 2001/267; G03H 2240/20; G03H 2270/14; G03H 2001/0432; G03H 2001/0489; G03H 2001/2665; G03H 2222/45; G03H 2260/50; G03H 2270/10; G03H 2270/30; G03H 2001/0044; G03H 2001/0463; G03H 2001/2268; G03H 2001/2278; G03H 2240/25; G03H 2260/10; G03H 2260/30; G01B 11/2441; G01B 9/02039; G01B 9/02057; G01B 9/02072; G01B 9/021; G01B 11/25; G01B 11/24; G01B 2290/30; G01B 11/2513; G01B 9/02085; G01B 11/255; G01B 9/02027; G01B 11/22; G01B 9/02028; G01B 2290/70; G01B 9/02; G01B 9/02038; G01B 11/00; G01B 11/30; G01B 11/2518; G01B 9/02058; G01B 2290/65; G01B 9/02055; G01B 9/02087; G01B 11/026; G01B 9/02007; G01B 11/272; G01B 9/023; G01B 11/254; G01B 11/2504; G01B 21/042; G01B 2210/52; G01B 9/02041; G01B 11/0675; G01B 9/02022; G01B 9/02032; G01B 9/0209; G01B 11/303; G01B 9/02011; G01B 9/02019; G01B 9/02061; G01B 2290/45; G01B 9/02047; G01B 11/14; G01B 9/02084; G01B 11/005; G01B 11/02; G01B 2290/15; G01B 9/02021; G01B 9/02003; G01B 9/02024; G01B 9/02091; G01B 2210/56; G01B 2290/60; G01B 9/02015; G01B 11/007; G01B 11/306; G01B 21/045; G01B 9/02016; G01B 9/02075; G01B 11/002; G01B 11/03; G01B 11/2425; G01B 11/2509; G01B 11/2531; G01B 5/008; G01B 9/02034; G01B 9/02068; G01B 9/02069; G01B 11/12; G01B 11/26; G01B 9/0201; G01B 9/02059; G01B 9/02076; G01B 11/06; G01B 11/0625; G01B 11/105; G01B 2210/50; G01B 2290/20; G01B 9/0207; G01B 9/027; G01B 11/0608; G01B 11/0633; G01B 11/065; G01B 11/162; G01B 11/245; G01B 9/02009; G01B 1/00; G01B 11/164; G01B 11/2408; G01B 11/2416; G01B 11/2433; G01B 21/047; G01B 2210/54; G01B 5/00; G01B 5/0004; G01B 5/0014; G01B 7/008; G01B 9/02018; G01B 9/02035; G01B 9/02044; G01B 9/02049; G01B 9/02052; G01B 9/02063; G01B 9/02065; G01B 9/02081; G01B 11/028; G01B 11/16; G01B 11/161; G01B 11/2527; G01B 11/27; G01B 21/20; G01B 2290/35; G01B 2290/40; G01B 9/02004; G01B 9/02005; G01B 9/02056; G01B 9/02067; G01B 9/02074; G01B 9/02083; G01B 9/04; G01B 11/043; G01B 11/0616; G01B 11/08; G01B 2290/50; G01B 5/213; G01B 9/02008; G01B 9/02045; G01B 9/02005; G01B 9/02094; G01B 9/02097; G01B 11/046; G01B 11/2522; G01B 21/04; G01B 5/0002; G01B 7/00; G01B 9/02002; G01B 9/02012; G01B 9/02025; G01B 9/02062; G01B 9/02064; G01B 9/02095; G01B 9/02096; G01B 9/02098; G01M 11/005; G01M 11/0271; G01M 11/025; G01M 11/0264; G01M 11/0207; G01M 11/02; G01M 11/0242; G01M 11/0285; G01M 11/0221; G01M 11/0214; G01M 11/0257; G01M 11/0235; G01M 11/0292; G01M 11/338; G01M 11/0228; G01M 1/3163; G01M 5/005; G01M 11/00; G01M 11/0278; G01M 11/081; G01M 11/085; G01M 11/04

See application file for complete search history.

(56) References Cited

U.S. PATENT DOCUMENTS

| | | | | |
|---|---|---|---|---|
| 6,559,952 | B1* | 5/2003 | Bokor | G01B 9/02043 356/520 |
| 7,145,710 | B2* | 12/2006 | Holmes | H04J 14/0212 219/121.75 |
| 7,583,425 | B1* | 9/2009 | Williams | G02B 26/06 382/280 |
| 8,405,680 | B1 | 3/2013 | Cardoso Lopes et al. | |
| 10,185,288 | B2* | 1/2019 | Yoon | G03H 1/2294 |
| 2003/0202634 | A1 | 10/2003 | Gerchberg | |
| 2007/0035803 | A1 | 2/2007 | Holmes | |
| 2011/0216296 | A1 | 9/2011 | Matsubara | |
| 2015/0146196 | A1* | 5/2015 | Huang | G01M 11/0257 356/121 |

(56) References Cited

U.S. PATENT DOCUMENTS

2018/0107160 A1\* 4/2018 Ulvestad .............. G01N 23/207
2019/0187613 A1 6/2019 Kesti et al.

FOREIGN PATENT DOCUMENTS

EP 3339963 A1 \* 6/2018 ........... G03H 1/0005
KR 20180036921 A \* 4/2018

\* cited by examiner

COMPLEX DIVERSITY FOR ACCURATE PHASE RETRIEVAL WITH SINGLE SHOT ACQUISITION

CROSS-REFERENCE TO RELATED APPLICATIONS

This application is a national stage entry pursuant to 35 U.S.C. § 371 of Patent Cooperation Treaty (PCT) international application No. PCT/US2020/042112, filed on Jul. 15, 2020 which claims priority to, and the benefit of the filing date of, U.S. provisional application No. 62/874,208, filed on Jul. 15, 2019, entitled "COMPLEX DIVERSITY FOR ACCURATE PHASE RETRIEVAL WITH SINGLE SHOT ACQUISITION" which are all hereby incorporated herein by reference in its entirety their entireties.

TECHNICAL FIELD

The present disclosure is directed to phase retrieval, and more particularly, to a phase retrieval technique that uses complex diversity to improve phase retrieval accuracy with single-shot acquisition.

BACKGROUND

Phase retrieval is a technique used to measure unknown extrinsic phase disturbances, which is attractive because of its simplicity compared to more complicated systems that involve interferometers or Shack-Hartmann sensors. Drawbacks to conventional phase retrieval techniques include the requirement of performing multiple image acquisitions ("shots"), low accuracy, and stagnation issues. Some of these issues have been overcome by single-shot phase retrieval techniques associated with various diversities. These single-shot phase retrieval techniques achieve multiple measurements through the use of special gratings designed to generate multiple diffraction orders that are detected simultaneously in a single image acquisition. In either multiple-shot or single-shot techniques, each measurement is characterized by the filter applied to the pupil of the optical system that modifies the image distribution. For example, focus diversity applies quadratic phase filters with different peak values to each measurement. This filter must be known precisely for accurate extrinsic phase reconstruction. However, for single-shot techniques the effective filter applied to the diffracted orders and an accurate reconstruction algorithm that utilizes the effective filters have not been adequately developed.

The original phase retrieval algorithm was credited to Gerchberg and Saxton in 1972. The algorithm was later generalized by using finite support and non-negativity constraints. In subsequent years, accuracy and convergence were improved by implementing several different diversities, such as defocus diversity, translation diversity, shifting illumination, and random diversity. However, these diversity techniques generally require multiple shots.

Recently, single-shot phase retrieval techniques with special gratings have overcome this multiple-shot issue. Blanchard et al. pioneered the single-shot technique with a distorted grating that introduces defocus into +/−1 diffraction orders. Then, its easy implementation without energy loss was proposed with a spatial light modulator (SLM). Other diversity techniques, like translational diversity, multiple illumination, and weakly scattering phase, were also realized with single-shot techniques by implementing Dammann gratings. Yao et al. also proposed a new phase grating designed to introduce different transmittance filters into the diffracted orders.

Phase gratings and computer-generated holograms (CGHs) are attractive for distribution of multiple images on a camera plane in a single shot because they create multiple orders without power loss and are easily implemented with a SLM. However, the true effective filters applied to individual diffraction orders are not obvious. Even though the CGHs are designed from seed filter patterns, the true effective filters are not the same as the seed filters, because the complex field modulation is not constrained in the design process, as explained below.

A need exists for a single-shot phase retrieval technique that overcomes the aforementioned disadvantages and drawbacks of the current single-shot phase retrieval technique.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
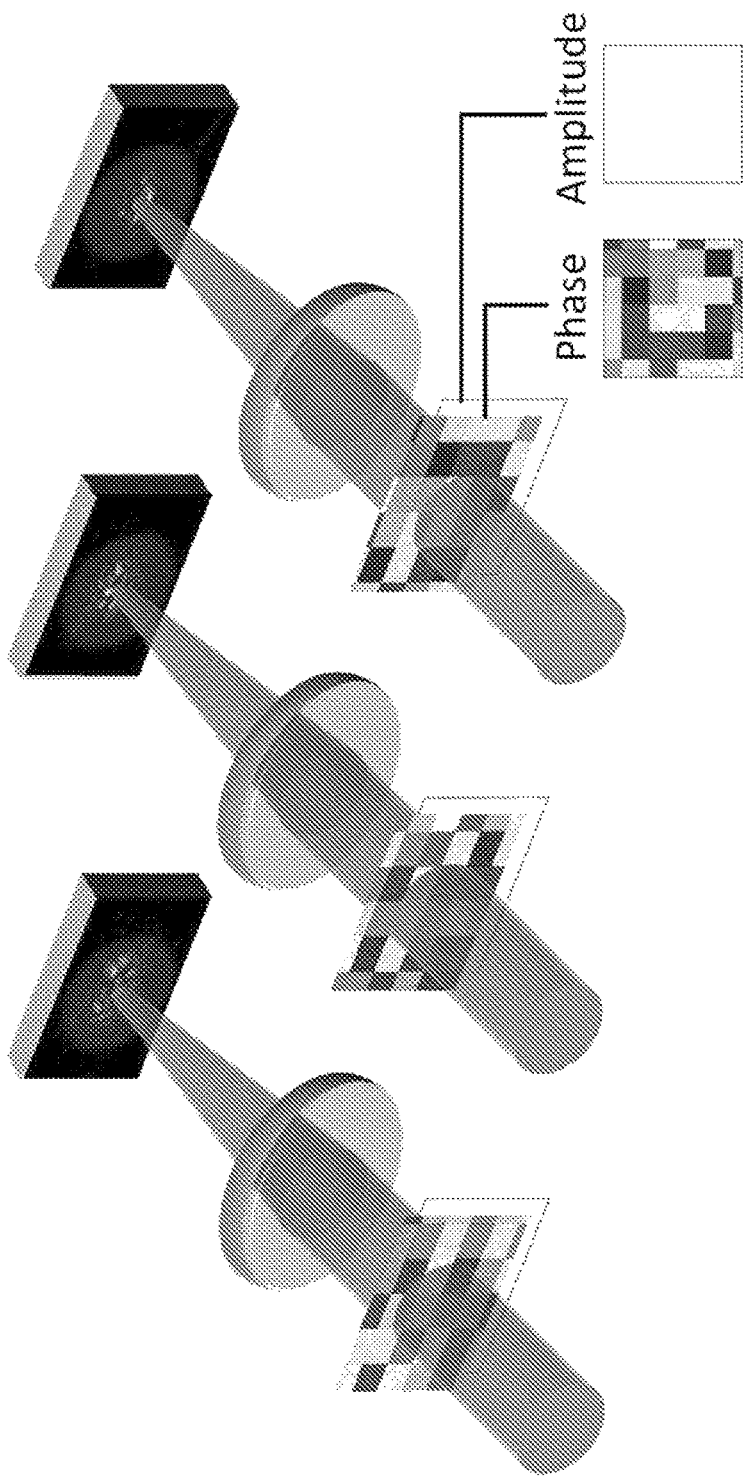
FIG. 1 is a perspective view of a known single-shot acquisition phase retrieval technique being performed with conventional diversity.

The present disclosure is directed to a new diversity concept for achieving accurate phase retrieval with a single-shot acquisition. Multiple irradiance data are obtained by a diffractive grating or CGH designed to generate multiple diffraction orders with different diversity values. The effective filters associated with the individual diffraction orders from the diffractive grating or CGH are calculated. The effective filters are extracted by numerical propagation, and they preferably include both real and imaginary values, which signify both absorption and phase shift versus position in the filter plane. The reconstruction process uses accurate knowledge of the effective filters for each diffraction order for high quality reconstruction of the extrinsic phase. This is in contrast to the common practice of specifying only the phase portion of the filter. The new concept of the phase retrieval technique with the effective filters is referred to herein as "complex diversity."

A modified classical Fourier iterative algorithm may be used for reconstruction of the extrinsic aberration in order to avoid noise amplification due to small amplitudes of the effective filters. The complex diversity technique is evaluated herein by numerical simulations and preliminary adaptive optics (AO) experiments with a synthetic extrinsic aberration and a liquid crystal on silicon (LCoS) SLM.

As indicated above, single-shot phase retrieval techniques overcome drawbacks of conventional phase retrieval techniques by capturing multiple images in a single acquisition, where the multiple images are generated by special gratings. However, the discussion below shows that there are special considerations in the design of the system and the reconstruction algorithm for single-shot techniques that have not been adequately addressed. The concept of complex diversity introduced in the present disclosure adequately accounts for these special considerations, where complex-number pupil filters containing both amplitude and phase values are extracted by numerical propagation from the grating or CGH design. In accordance with an embodiment, the reconstruction is performed by a Fourier iterative algorithm modified with an area restriction to avoid noise amplification. Numerical simulations show that the complex diversity technique estimates extrinsic Kolmogorov aberration better than known single-shot techniques for a distance point object. Experiments show that a sensor-less adaptive optics correction is achieved using the complex diversity technique.

In the following detailed description, for purposes of explanation and not limitation, exemplary, or representative, embodiments disclosing specific details are set forth in order to provide a thorough understanding of inventive principles and concepts. However, it will be apparent to one of ordinary skill in the art having the benefit of the present disclosure that other embodiments according to the present teachings that are not explicitly described or shown herein are within the scope of the appended claims. Moreover, descriptions of well-known apparatuses and methods may be omitted so as not to obscure the description of the exemplary embodiments. Such methods and apparatuses are clearly within the scope of the present teachings, as will be understood by those of skill in the art. It should also be understood that the word "example," as used herein, is intended to be non-exclusionary and non-limiting in nature.

The terminology used herein is for purposes of describing particular embodiments only, and is not intended to be limiting. The defined terms are in addition to the technical, scientific, or ordinary meanings of the defined terms as commonly understood and accepted in the relevant context.

The terms "a," "an" and "the" include both singular and plural referents, unless the context clearly dictates otherwise. Thus, for example, "a device" includes one device and plural devices. The terms "substantial" or "substantially" mean to within acceptable limits or degrees acceptable to those of skill in the art. For example, the term "substantially parallel to" means that a structure or device may not be made perfectly parallel to some other structure or device due to tolerances or imperfections in the process by which the structures or devices are made. The term "approximately" means to within an acceptable limit or amount to one of ordinary skill in the art. Relative terms, such as "over," "above," "below," "top," "bottom," "upper" and "lower" may be used to describe the various elements' relationships to one another, as illustrated in the accompanying drawings. These relative terms are intended to encompass different orientations of the device and/or elements in addition to the orientation depicted in the drawings. For example, if the device were inverted with respect to the view in the drawings, an element described as "above" another element, for example, would now be below that element.

Relative terms may be used to describe the various elements' relationships to one another, as illustrated in the accompanying drawings. These relative terms are intended to encompass different orientations of the device and/or elements in addition to the orientation depicted in the drawings.

The term "memory" or "memory device", as those terms are used herein, are intended to denote a non-transitory computer-readable storage medium that is capable of storing computer instructions, or computer code, for execution by one or more processors. References herein to "memory" or "memory device" should be interpreted as one or more memories or memory devices. The memory may, for example, be multiple memories within the same computer system. The memory may also be multiple memories distributed amongst multiple computer systems or computing devices.

A "processor" or "processing device," as those terms are used herein encompass an electronic component that is able to execute a computer program or executable computer instructions. References herein to a system comprising "a processor" or "a processing device" should be interpreted as a system having one or more processors or processing cores. The processor may for instance be a multi-core processor. A processor may also refer to a collection of processors within a single computer system or distributed amongst multiple computer systems. The term "computer," as that term is used herein, should be interpreted as possibly referring to a single computer or computing device or to a collection or network of computers or computing devices, each comprising a processor or processors. Instructions of a computer program can be performed by a single computer or processor or by multiple processors that may be within the same computer or that may be distributed across multiple computers.

The following discussion is presented in the following sections. Section 1 describes the concept and the principle of complex diversity. Section 2 describes simulation results that indicate that the complex diversity technique estimates extrinsic aberration better than the conventional single-shot technique. Section 3 shows experimental results. Section 4 lists primary conclusions from this work.

Although the representative embodiments are directed to demonstrating the concepts and principles of complex diversity in phase retrieval for use with adaptive optics (AOs), it should be noted that the complex diversity technique described herein can be implemented with other devices and systems, including, for example, augmented reality (AI), virtual reality (VR) and mixed reality (MR) devices. Additionally, the complex diversity technique is also applicable to a wide range of other inverse problems.

1. PRINCIPLE

A. Concept of Complex Diversity

Figure 2:
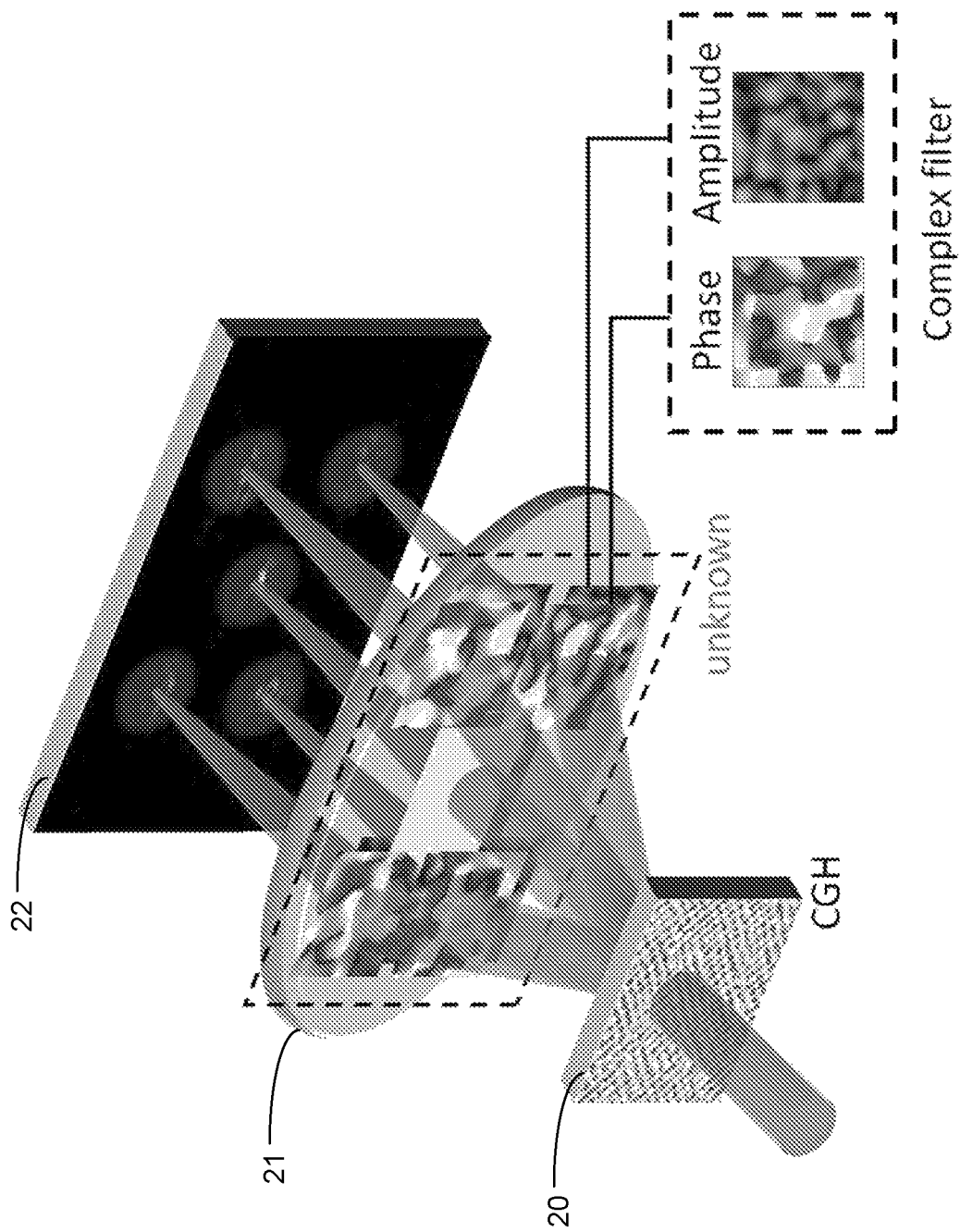
FIG. 2 is a perspective view of a known single-shot acquisition phase retrieval technique being performed with complex diversity in accordance with a representative embodiment.

FIG. 1 is a diagram illustrating the conventional phase diversity technique, which measures multiple irradiance images with different filters in the pupil plane. Following Gerchberg's notation, the series of different irradiance images generated from different phase filters are called phasorgrams. In contrast, in accordance with a representative embodiment of the present disclosure, a CGH generates multiple diffraction orders with different effective filters that create multiple images at different positions on an image sensor. FIG. 2 is a diagram illustrating the complex diversity technique in accordance with representative embodiments disclosed herein. A CGH 20 generates multiple diffraction orders with different effective filters 21 that create multiple images at different positions on an image sensor 22. It should be noted that a diffractive grating may be used instead of a CGH.

As can be seen in FIG. 2, by dividing the image, multiple phasorgrams are obtained from a single image acquisition. In conventional phase diversity reconstruction algorithms, phase filters corresponding to the phasorgrams are the same as the phase filters used to generate the phasorgrams. On the other hand, effective filters used for reconstruction are not obvious in single-shot techniques, and they include both amplitude and phase information. The following sub-sections describe the design of the CGH, extraction of the effective filters, and the modified reconstruction algorithm in accordance with a representative embodiment.

B. CGH Design

Figure 3:
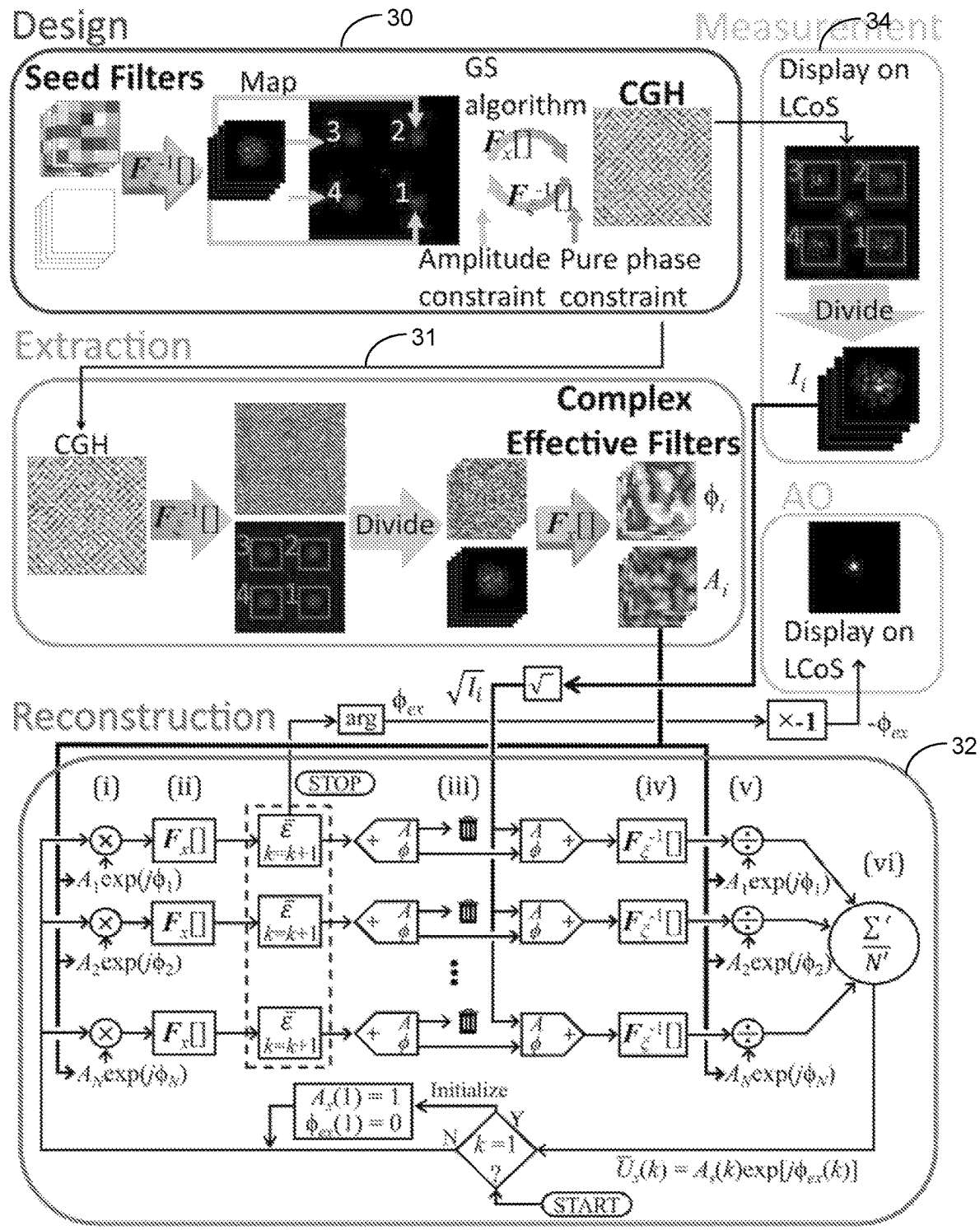
FIG. 3 is a flow diagram of the phase retrieval technique that uses complex diversity to perform phase retrieval with single-shot acquisition.

FIG. 3 is a flow diagram showing the different stages for designing the CGH 20, extracting the effective filters and image reconstruction. The phase retrieval technique of the present disclosure in accordance with a representative embodiment comprises these three main stages or steps, as illustrated in FIG. 3. The first step 30 is designing the CGH, which starts with setting up N seed filters that are proper for determining an extrinsic aberration. In principle, arbitrary modulations can be used as the seed filters. In this disclosure, random phase seed filters are selected, because they show better performance for estimating Kolmogorov extrinsic disturbances than other forms of diversity. Especially for single-shot techniques, it is important to keep the dynamic range of signal values for all phasorgrams at nearly the same levels, because exposure time and incident light power cannot be adjusted for the individual phasorgrams. With random phase diversity, generated phasorgrams exhibit similar peak values, unlike defocus diversity.

The seed filters are converted to complex field phasorgrams by taking the inverse Fast Fourier Transforms (IFFTs). Amplitudes of the complex fields of the N individual phasorgrams are mapped onto different positions in the image plane. This multiple-phasorgram amplitude distribution is the target amplitude for the CGH design. Conventional CGH design techniques, such as the Gerchberg-Saxton (GS) algorithm and the modified GS technique, can be used for this design. The constraints in the CGH design include a pure phase constraint in the pupil plane and the amplitude target distribution in the image plane. The designed CGH is displayed on the LCoS 34 during the measurement.

C. Extraction of Effective Filters

The second step 31 is an extraction of the N complex effective filters. Although the CGH generates the same amplitude patterns as generated from individual seed filters, the field modulations introduced into the diffraction orders are not the same as the seed filters when using the CGH because the CGH design process does not constrain these field modulations. Thus, in accordance with representative embodiments disclosed herein, the actual effective filters are extracted from the designed CGH.

The complex field reflected from the CGH pattern is calculated in a computer by assuming illumination with a uniform plane-wave amplitude. Then, the field is numerically propagated to the image plane by an IFFT. The complex field at the image plane is divided into N individual subareas corresponding to the phasorgrams by cropping data in the image plane, which results in a collection of phasorgrams. The phasorgram fields from the cropped subareas are individually propagated back to the pupil plane with FFTs. The resulting collection of N complex field patterns in the pupil plane are the effective filters introduced to the individual diffraction orders. The design process and the extraction process need only be performed one time when a new CGH is generated. Thus, these additional process steps do not increase computational time for the reconstruction.

D. Reconstruction Algorithm

The third step 32 is reconstruction. The experimentally measured single-shot irradiance pattern using the CGH displayed on LCOS 34 and the extrinsic aberration is divided into N individual phasorgram subareas. These are used in the reconstruction step 32. In accordance with a representative embodiment, the reconstruction algorithm is a known iterative Fourier method with field average proposed by Gerchberg, which is modified for complex diversity. It starts with setting an initial guess in the pupil plane as a flat phase, i.e., no aberration. Then, the following steps proceed in an iterative manner: (1) the effective filters are applied to yield N individual pupil fields by multiplying the complex transmission of the effective filter by the estimate of the extrinsic phase distribution; (2) FFTs generate N individual complex fields on the image plane; (3) an amplitude constraint is applied by replacing the calculated amplitudes with the measured phasorgram set, but the phase distribution is not disturbed; (4) inverse FFTs are applied to the N fields to propagate them back to the pupil plane; (5) the resulting complex pupil fields are divided by the effective filters, in order to form N individual estimates of the extrinsic phase; (6) these N estimates are averaged to obtain the iteration's final estimate of the extrinsic field, except in areas where amplitudes of the effective filters are smaller than a threshold value to avoid noise amplification. In this experiment, the threshold value is set to 10% of the maximum amplitude. The process comprising steps (1) to (6) is defined as one iteration, and iterations preferably are repeated until an error measure between the measured irradiance pattern and the synthetically generated pattern falls below a target threshold value, or the iteration number reaches a pre-determined maximum. After the estimated extrinsic complex field in the pupil plane is retrieved, the complex conjugate of the retrieved phase is displayed on the LCoS 34 to achieve AO correction for compensation of the extrinsic aberration.

2. SIMULATION

Figure 4A:
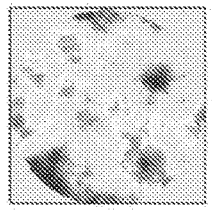
FIG. 4A shows a simulated extrinsic aberration in the form of a synthetic Kolmogorov phase disturbance.

To match the experimental conditions, simulations are run in which the wavelength $\lambda$ is 632.8 nm and the image side numerical aperture (NA) is 0.01. The pixel size of the 1280×1024 image sensor is 5.2 micrometers (pin). A synthetic Kolmogorov phase disturbance, which is applicable in astronomy and biological imaging, is the extrinsic aberration, as shown in FIG. 4A. The seed filters for the CGH design are random phase patterns with super-pixel segments, and N=4 in this simulation. The CGH is designed by the modified GS algorithm with the amplitude constraint at the image plane generated from the seed filters, and a pure phase constraint implemented at the pupil plane. The effective filters are extracted from the designed CGH as described above in Section C.

Figure 4B:
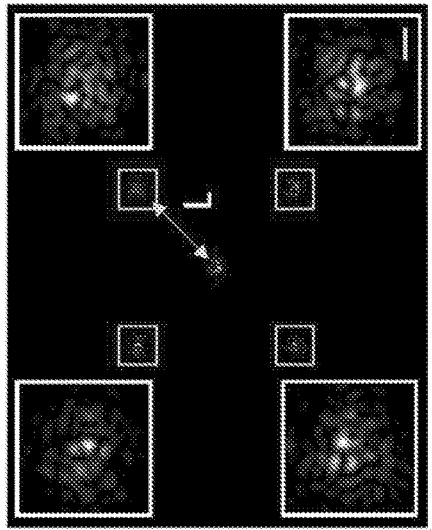
FIG. 4B shows a simulated irradiance pattern in the image plane that results when using the synthetic Kolmogorov phase disturbance shown in FIG. 4A as the extrinsic aberration.
Figure 4C:
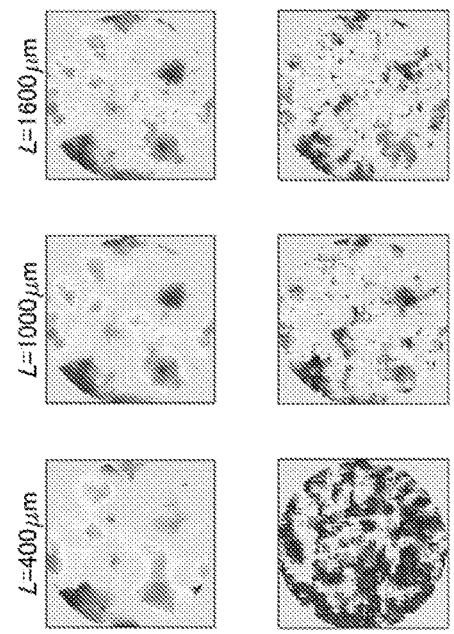
FIG. 4C shows retrieved phases from the simulated irradiance patterns shown in FIG. 4B with $L_s=D/16$, with the effective filters used to obtain the retrieved phases shown in the top row and the seed filters used to obtain the retrieved phases shown in the top row.

FIG. 4B shows a simulated irradiance pattern in the image plane that results when using the synthetic Kolmogorov phase disturbance shown in FIG. 4A as the extrinsic aberration. The reconstruction is performed with both the effective filters and the seed filters to show the improvement that occurs when using complex diversity. Comparisons are made with different separations between the $0^{th}$ and $1^{st}$ diffraction orders. As indicated by L in FIG. 4B, different sizes of the super-pixels $L_s$=D/16, and D/32 on a side are used, where D is the diameter of the incident beam at the pupil plane. FIG. 4C shows retrieved phases from the simulated irradiance patterns shown in FIG. 4B for $L_s$=D/16. The top row in FIG. 4C contains retrieved phases by the complex diversity technique with different L values, and the bottom row shows retrieved phases with the conventional diversity technique. As compared with the reference extrinsic aberration shown in FIG. 4A, it can be seen from FIG. 4C that complex diversity performs better than conventional diversity.

Figure 4D:
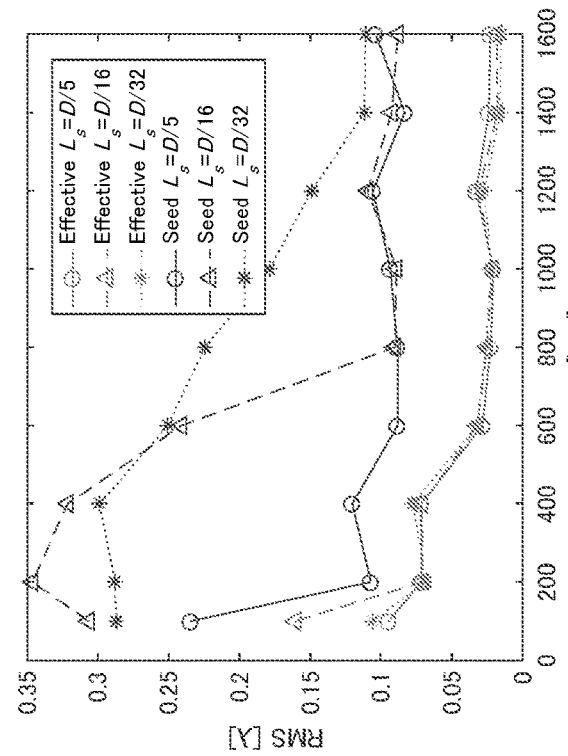
FIG. 4D shows residual errors of the estimated aberrations shown in FIG. 4C, where the residuals are evaluated by the root mean square (RMS) of the residual phase between the reference phase and the estimated phase.

FIG. 4D shows residual errors of the estimated aberrations. The residuals are evaluated by the root mean square (RMS) of the residual phase between the reference phase and the estimated phase. Complex diversity exhibits from 1.5 to 8.6 times lower RMS values than conventional diversity, and the improvements are relatively greater with shorter L values. The array of super-pixels with period $L_s$ results in a maximum range of light scattering at the image plane of $$D_{samp} = \frac{1}{2} \frac{\lambda}{NA} \frac{D}{L_s}, \quad (1)$$

where $\lambda$ is wavelength, and NA is numerical aperture on the image side. $D_{samp}$ are calculated as 158 μm, 506 μm, and 1013 μm for $L_s$=D/5, D/16, and D/32, respectively. As overlaps between phasorgrams increase for L shorter than $D_{samp}$, the effective filters differ more from the seed filters. Therefore, the complex diversity technique works better than the conventional diversity technique in the range of the shorter L. In some applications, like imaging a star field with separated incoherent point sources, the separation L should be small to avoid overlaps between the phasorgram regions. In that case, the complex diversity technique has a significant advantage over using the seed filters in the reconstruction algorithm.

3. EXPERIMENT

Figure 5:
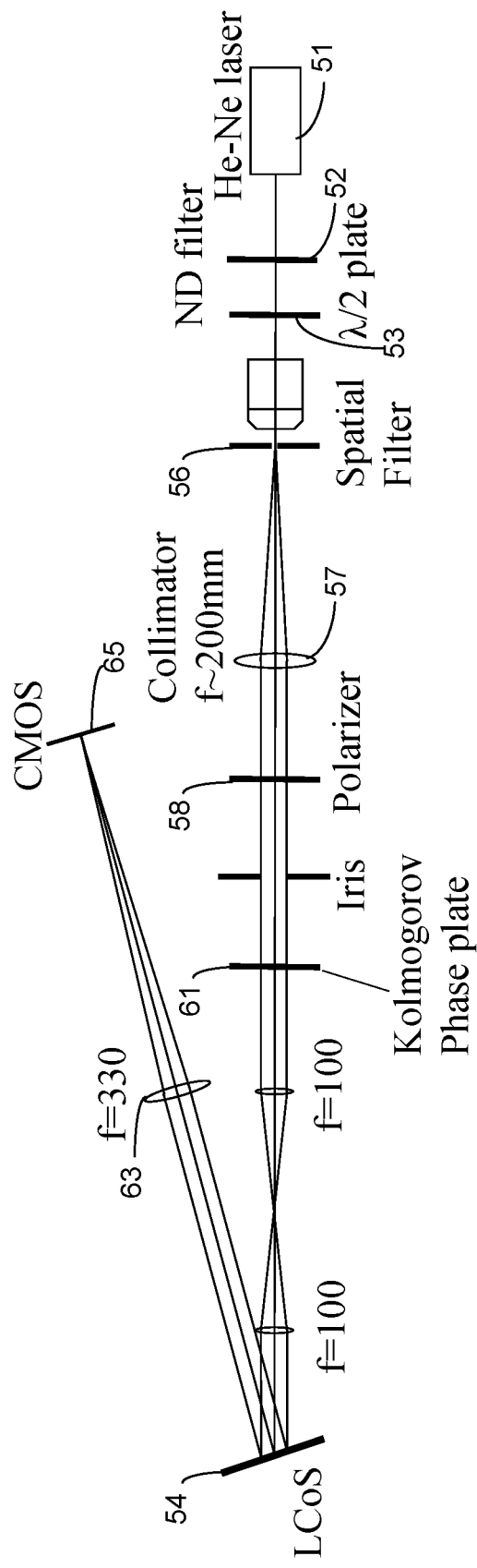
FIG. 5 shows an experimental setup for performing phase retrieval with complex diversity and single-shot acquisition in accordance with a representative embodiment.

The experimental setup is shown in FIG. 5. Light from an HeNe laser 51 is attenuated through a ND filter 52, and its polarization is rotated by a $\lambda/2$ plate 53 to match it to the axis of the LCoS 54. The wave-front is made nearly uniform by a spatial filter 56, and collimated by a collimator 57. The collimated light passes through a polarizer 58 that cuts out unwanted polarization. The light then illuminates an artificial Kolmogorov phase plate 61 placed on a conjugated plane to the LCoS 54. The light distorted by the phase plate 61 is relayed to the LCoS 54, and the CGH displayed on the LCoS 54 generates multiple diffracted light beams. An imaging lens 63 forms the diffracted light beams into multiple spots on a CMOS image sensor 65. A captured irradiance image is stored and post processed as described below in more detail. It should be noted that the inventive principles and concepts are not limited to the experimental setup shown in FIG. 5, as will be understood by those of skill in the art in view of the description provided herein.

The extrinsic aberration is associated with the Kolmogorov phase plate 61 placed in a plane conjugate to the LCoS 54. The CGH design process and the effective filter extraction process are the same as the simulation described above in detail. In the experimental setup, the CGH is designed for spot separation L=1600 μm on the image plane, and $L_s$=D/5. The CGH is displayed on the LCoS 54, and the irradiance pattern is measured by the CMOS image sensor 65. In the experiments, calibration of spot positions is performed before the measurement is taken. The reconstruction process estimates the extrinsic aberration from the single irradiance pattern, as described below in more detail. AO correction is achieved by displaying the complex conjugate of the retrieved aberration on the LCoS 54.

Figure 6A:
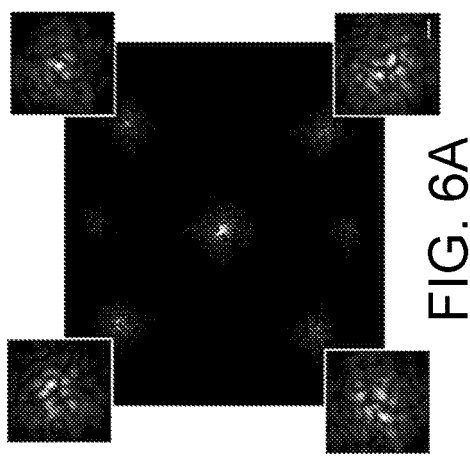
FIG. 6A shows a measured irradiance pattern obtained by the experimental setup shown in FIG. 5.
Figure 6C:
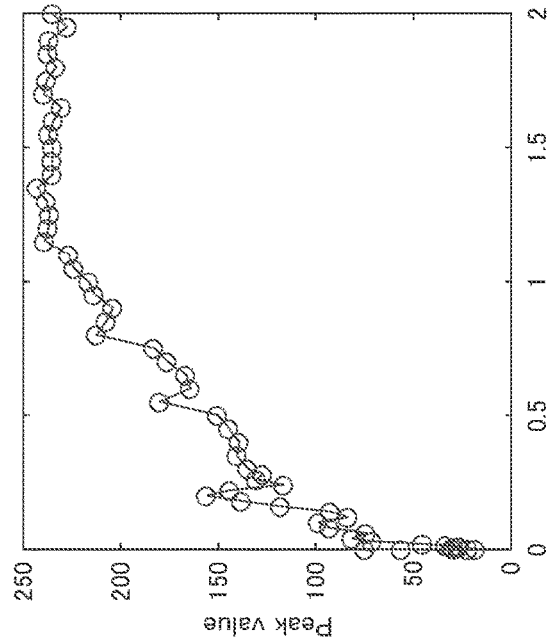
FIG. 6B shows the phase retrieval results before correction and after a particular number of iterations of the process shown in FIG. 3C to perform AO correction; the top left image is the image before correction, and the bottom right is the image without the LCoS and the artificial Kolmogorov phase plate being used; the numbers of the other images show the iteration number.
Figure 6B:
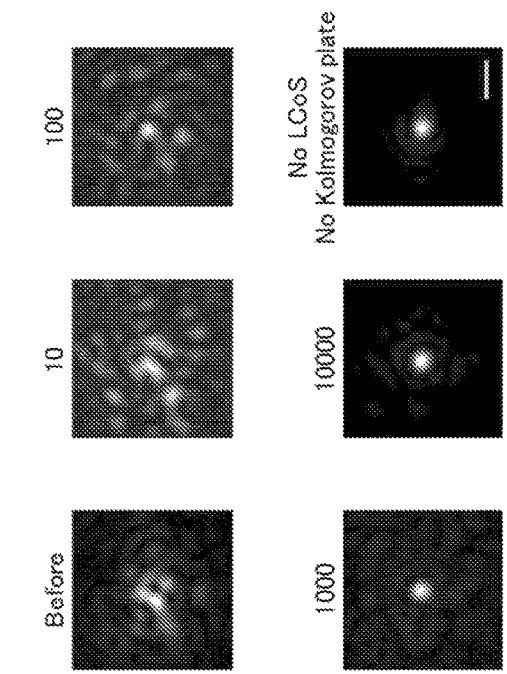

FIG. 6A shows a measured irradiance pattern measured by the CMOS image sensor 65. Four diffracted orders are observed at the corners of the image. The $0^{th}$ order diffraction light in the center of the figure is stronger than the distributed phasorgrams at the corners. This peak irradiance difference may be due to mis-matching of the polarization axis between the incident light and the LCoS 54. Exposure time is adjusted to make the distributed phasorgrams within the dynamic range of the CMOS image sensor 65, even though the $0^{th}$ order diffraction light is saturated. The measured irradiance image is divided into four phasorgrams, and the extrinsic aberration is reconstructed. FIG. 6B shows corrected images. Before AO correction, a point image is totally disturbed due to the artificial Kolmogorov phase plate 61. As iterations increase, image quality is improved. After, for example, 10000 iterations, the corrected point images are almost identical to the image measured without the artificial Kolomogorov phase plate 61 and the LCoS 54, which shows that the complex diversity technique works as a sensor-less AO correction. As shown in FIG. 6C, peak values of the corrected spots rise with more iterations, and they saturate after about 10000 iterations. Retrieved phases are compared between the complex diversity technique and the conventional interferometric measurement, and reasonable matching is obtained.

Although the design of the CGH is known, center positions of the diffraction spots on the CMOS image sensor 65 are unknown due to alignment errors. Even if the alignment is perfect, it is still difficult to determine the center positions because the spot patterns are distorted by the CGH, as shown in the FIG. 7A, which shows a reference CGH. Thus, the center positions of the spots should be calibrated before the measurement is performed.

Figure 7B:
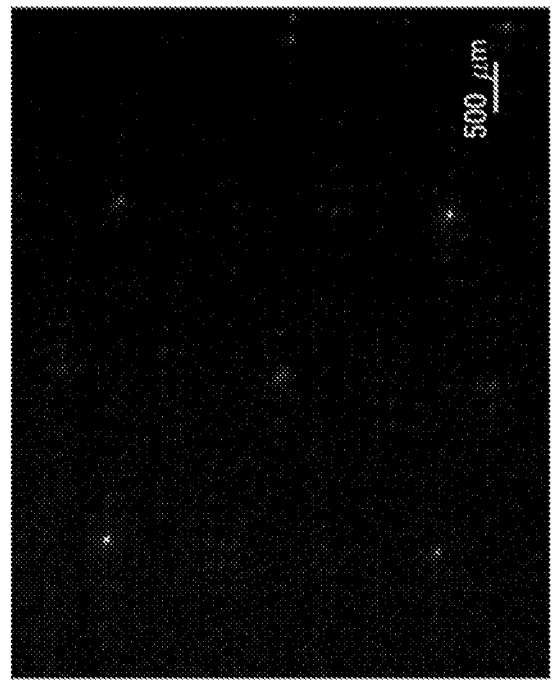
FIG. 7B shows a reference irradiance image captured using the reference CGH shown in FIG. 7A.
Figure 7A:
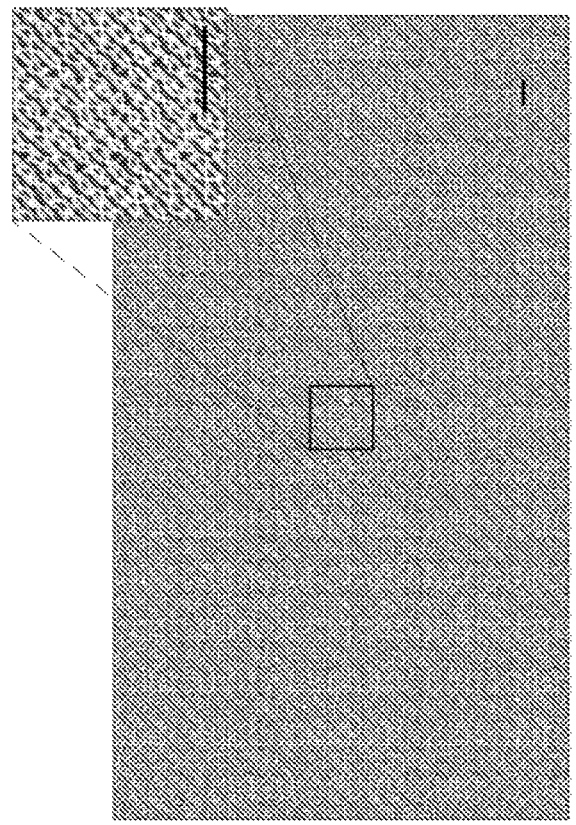
FIG. 7A shows a reference CGH used in the calibration process in accordance with a representative embodiment.

In the calibration process, the reference CGH such as that shown in FIG. 7A is used. The reference CGH is designed by the same process described above except that seed modulations are all flat phases. The designed reference CGH is displayed on the LCoS 54, and the irradiance pattern is captured by the CMOS image sensor 65. The reference CGH generates less distorted spots on the same positions than those generated by the measurement CGH. Thus, it is easy to extract the center positions from the captured image. The reconstruction process refers to these spot positions.

FIG. 7B is a reference irradiance image. As shown in FIG. 7B, the center positions of the diffraction spots are easily found. These positions are stored in a memory device and loaded into the processor for processing during the reconstruction process 32 shown in FIG. 3.

Figure 8C:
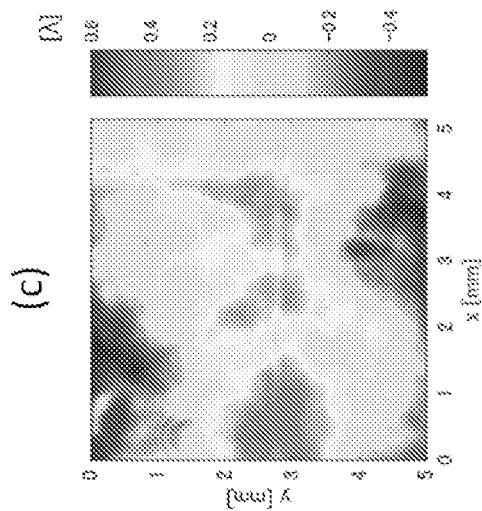
FIG. 8C is a reference phase measured using a Fizeau interferometer.
Figure 8B:
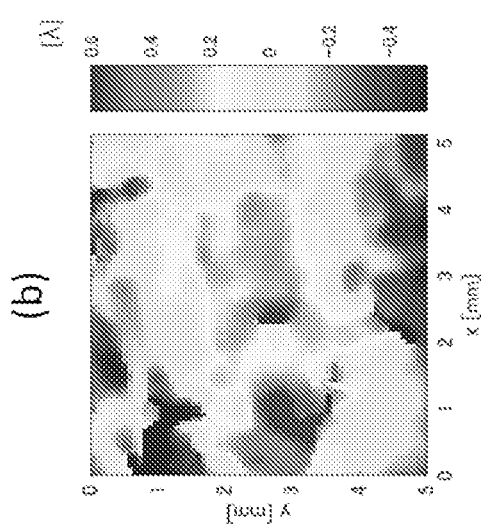
FIG. 8B shows the extrinsic aberration retrieved by dividing the irradiance image shown in FIG. 8A into an eight phasorgram set and performing reconstruction with eight complex modulations.
Figure 8A:
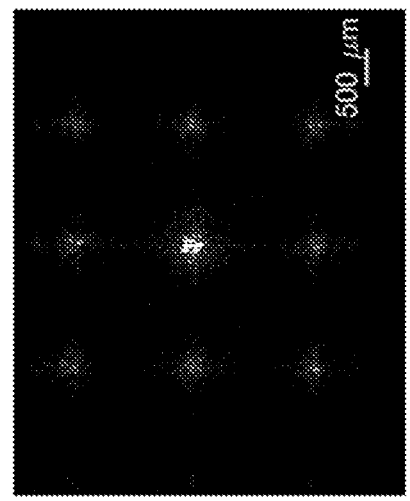
FIG. 8A shows an irradiance image captured using the experimental setup shown in FIG. 5, where the CGH is designed from eight random phase modulations with $L_s$=D/5, and the separation L=1600 μm on the CMOS sensor.

In the experiment, the CGH is designed from eight random phase modulations with $L_s=D/5$, and the separation $L=1600$ μm on the CMOS sensor 115. A captured irradiance image is shown in FIG. 8A. The image is divided into an eight phasorgram set and the reconstruction with eight complex modulations retrieves the extrinsic aberration shown in FIG. 8B. FIG. 8C is a reference phase measured by a Fizeau interferometer (Zygo, XPZ). As compared to the retrieved phase and the reference phase, the estimated phase exhibits a similar profile to the reference phase. Due to unwrapping errors, drastic phase jumps appear in the retrieved phase.

Figure 9:
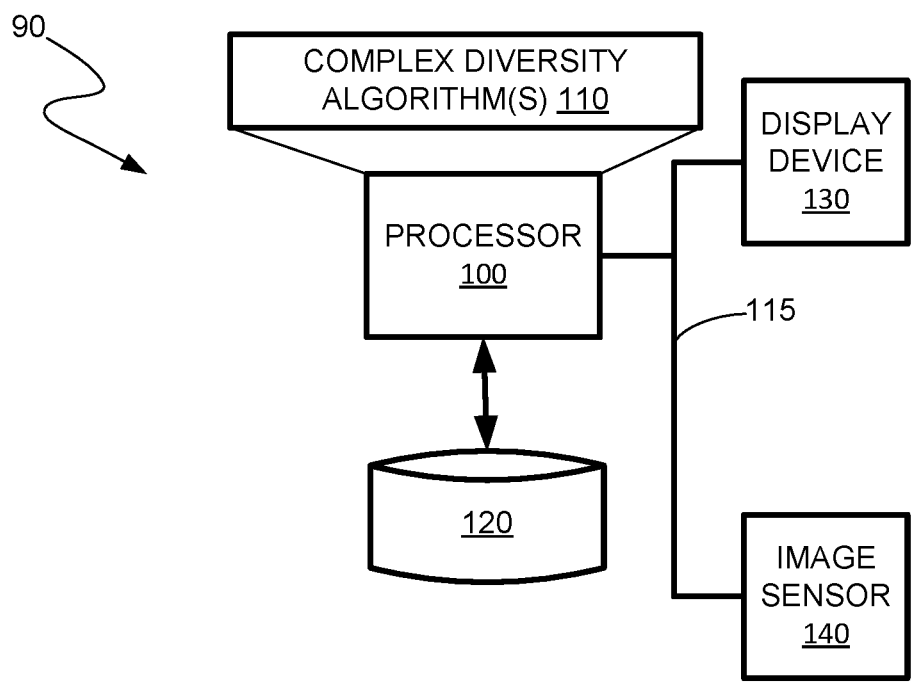
FIG. 9 is a block diagram of the system for performing the steps and processes shown in FIG. 3 in accordance with a representative embodiment.

FIG. 9 is a block diagram of the system 90 that performs the steps and processes described above with reference to FIG. 3 in accordance with a representative embodiment. The system 90 comprises a processor 100, a memory device 120 a display device 130 and an image sensor 140. The processor 100 is configured to perform the complex diversity algorithm(s) 110 described above with reference to FIG. 3. The algorithm(s) 110 can be performed in hardware, software, firmware of a combination thereof. The algorithm(s) 110 receives the output signals generated by the sensor 140 and processes them to perform complex diversity. The processor 100 causes the resulting images to be displayed on the display device 130. The memory device 120 is a nontransitory computer-readable medium that typically stores computer instructions for execution by the processor 100 and data. The sensor 140 and the display device 130 may be connected to a bus 115 to which the processor 100 is also connected to allow the processor 100 to control operations performed by those devices. However, while the bus 115 is depicted as a wired connection in FIG. 9, one or more of these devices may communicate via one or more wireless links.

It should be noted that any or all portions of algorithms described above that are implemented in software and/or firmware being executed by a processor (e.g., processor 100) can be stored in the memory device 120. For any component discussed herein that is implemented in the form of software or firmware, any one of a number of programming languages may be employed such as, for example, C, C++, C#, Objective C, Java®, JavaScript®, Perl, PHP, Visual Basic®, Python®, Ruby, Flash®, or other programming languages. The term "executable" means a program file that is in a form that can ultimately be run by the processor 100. Examples of executable programs may be, for example, a compiled program that can be translated into machine code in a format that can be loaded into a random access portion of the memory device 120 and run by the processor 100, source code that may be expressed in proper format such as object code that is capable of being loaded into a random access portion of the memory device 120 and executed by the processor 100, or source code that may be interpreted by another executable program to generate instructions in a random access portion of the memory device 120 to be executed by the processor 100, etc. An executable program may be stored in any portion or component of the memory device 120 including, for example, random access memory (RAM), read-only memory (ROM), hard drive, solid-state drive, USB flash drive, memory card, optical disc such as compact disc (CD) or digital versatile disc (DVD), floppy disk, magnetic tape, static random access memory (SRAM), dynamic random access memory (DRAM), magnetic random access memory (MRAM), a programmable read-only memory (PROM), an erasable programmable read-only memory (EPROM), an electrically erasable programmable read-only memory (EEPROM), or other like memory device.

Figure 10:
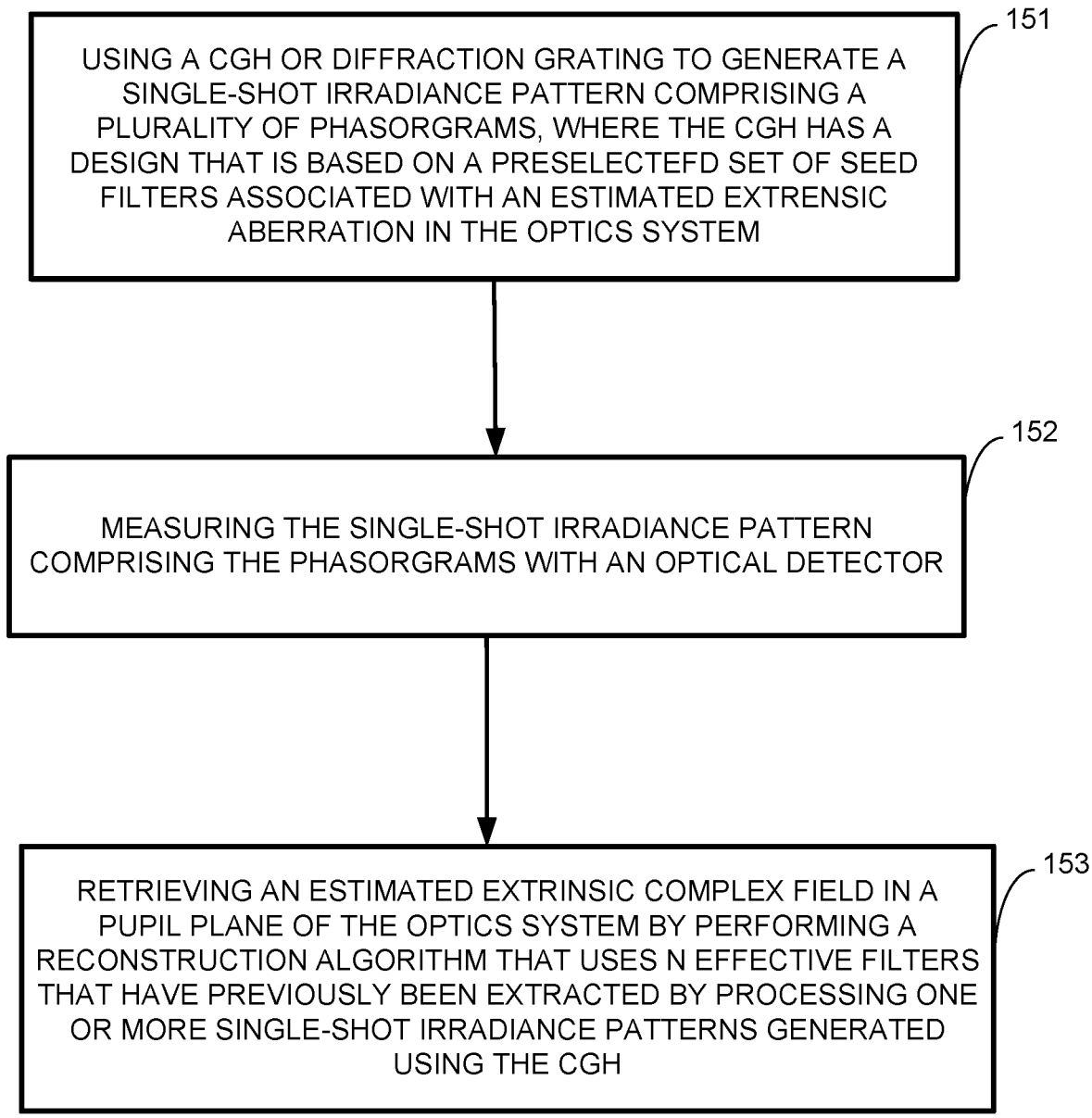
FIG. 10 is a flow diagram representing the complex diversity method in accordance with a representative embodiment.

FIG. 10 is a flow diagram representing the complex diversity method in accordance with a representative embodiment. Block 151 represents a step of using a CGH (or diffraction grating) to generate a single-shot irradiance pattern comprising N phasorgrams, where N is a positive integer that is greater than or equal to 2, and where the CGH has a design that is based on a preselected set of seed filters associated with an estimated extrinsic aberration in the optics system. Block 152 represents a step of measuring the single-shot irradiance pattern comprising N phasorgrams with an optical detector. Block 153 represents a step of retrieving an estimated extrinsic complex field in a pupil plane of the optics system by performing a reconstruction algorithm that uses N effective filters that have previously been extracted by an extraction algorithm that processes one or more single-shot irradiance patterns generated using the CGH to obtain the N effective filters.

4. CONCLUSION

In the present disclosure, a new phase retrieval technique called complex diversity is demonstrated, which produces multiple phasorgrams in a single-shot measurement by using a CGH designed to generate multiple diffraction orders. Complex effective filters are extracted by numerical propagation from the CGH design. The reconstruction process is performed with a Fourier iterative algorithm modified with an area restriction to avoid noise amplification. Improvement by the complex diversity technique is verified by the numerical simulations and AO experiments. Numerical simulations show that the complex diversity technique estimates the extrinsic aberration better than conventional single-shot techniques, and the improvement is drastic in the range of the small separation between $1^{st}$ and $0^{th}$ order diffraction spots. Experiments show that the complex diversity technique works as a sensor-less single-shot AO correction.

It should be noted that the inventive principles and concepts have been described with reference to representative embodiments, but that the inventive principles and concepts are not limited to the representative embodiments described herein. Although the inventive principles and concepts have been illustrated and described in detail in the drawings and in the foregoing description, such illustration and description are to be considered illustrative or exemplary and not restrictive; the invention is not limited to the disclosed embodiments. Other variations to the disclosed embodiments can be understood and effected by those skilled in the art, from a study of the drawings, the disclosure, and the appended claims.

What is claimed is:

1. A method for performing phase retrieval in an optics system, the method comprising:
using a computer-generated hologram (CGH) to generate a single-shot irradiance pattern comprising N phasorgrams derived from a single image acquisition, where N is a positive integer that is greater than or equal to 2, the CGH having a design that is based on a preselected set of seed filters associated with an estimated extrinsic aberration in the optics system;
measuring the single-shot irradiance pattern comprising the N phasorgrams with an optical detector; and
retrieving an estimated extrinsic complex field in a pupil plane of the optics system by performing a reconstruction algorithm that uses N effective filters that have previously been extracted by an extraction algorithm that processes one or more single-shot irradiance patterns generated using the CGH to obtain the N effective filters.

2. The method of claim 1, wherein the method includes using a retrieved phase to perform correction of adaptive optics (AOs) in the optics system to compensate for extrinsic aberration in the optics system, the method further comprising:
using a complex conjugate of the retrieved estimated extrinsic complex field to perform correction of the AOs to compensate for the extrinsic aberration in the optics system.

3. The method of claim 2, wherein the step of retrieving an estimated extrinsic complex field in a pupil plane of the optics system by performing a reconstruction algorithm comprises:
a) generating N individual pupil fields by multiplying a complex transmission of each effective filter by an estimate of an extrinsic phase distribution of the optics system;
b) generating N complex fields on the pupil plane by performing a fast Fourier transform (FFT) algorithm on the N individual pupil fields;
c) applying an amplitude constraint to the N complex fields by replacing amplitudes of the N complex fields with amplitudes of the N phasorgrams of the measured single-shot irradiance pattern without disturbing a phase distribution of the N complex fields;
d) performing an inverse FFT algorithm on the amplitude-constrained N complex fields to propagate the amplitude-constrained N complex fields back to the pupil plane; and
e) dividing the amplitude-constrained N complex fields propagated back to the pupil plane by the N effective filters, respectively, to form N individual estimates of extrinsic phase of the optics system.

4. The method of claim 3, further comprising:
f) after performing steps a) through e), calculating an error between the measured single-shot irradiance pattern and a synthetic single-shot irradiation pattern generated using the CGH; and
g) determining whether or not the calculated error is less than a predetermined threshold (TH) value;
wherein if a determination is made at step g) that the calculated error is not less than the predetermined TH value, reiterating steps a) through g); or
if a determination is made at step g) that the calculated error is less than the predetermined TH value, averaging the N individual estimates of extrinsic phase to obtain a final estimate of the extrinsic phase of the optics system.

5. The method of claim 4, further comprising:
prior to the step of using the CGH to generate a single-shot irradiance pattern comprising N phasorgrams, designing the CGH by:
selecting the preselected set of seed filters;
converting seed filters into complex field phasorgrams by taking an inverse Fast Fourier Transform (IFFT) of the preselected set of seed filters; and
mapping amplitudes of the complex field phasorgrams onto positions in an image plane to obtain a multiple-phasorgram amplitude distribution.

6. The method of claim 5, further comprising:
after designing the CGH and prior to performing the step of retrieving the estimated extrinsic complex field in the pupil plane of the optics system, performing the extraction algorithm by:
calculating a complex field of the CGH;
numerically propagating the complex field to the image plane by performing an IFFT of the complex field;
dividing the complex field at the image plane into N individual sub-areas corresponding to the N phasorgrams by cropping data in the image plane to obtain N cropped complex field patterns;
performing a Fast Fourier Transform (FFT) on the cropped complex field patterns to propagate the N cropped complex field patterns back to the pupil plane, wherein the N cropped complex field patterns in the pupil plane are the N effective filters, respectively.

7. The method of claim 1, wherein the optics system is implemented in an augmented reality (AR) device.

8. The method of claim 1, wherein the optics system is implemented in a virtual reality (VR) device.

9. The method of claim 1, wherein the optics system is implemented in a mixed reality (MR) device.

10. An optics system comprising:
a computer-generated hologram (CGH) configured to generate a single-shot irradiance pattern comprising N phasorgrams derived from a single image acquisition, where N is a positive integer that is greater than or equal to 2, the CGH having a design that is based on a preselected set of seed filters associated with an estimated extrinsic aberration in the optics system;
an optical detector configured to measure the single-shot irradiance pattern comprising the N phasorgrams; and
a processor configured to perform a reconstruction algorithm that retrieves an estimated extrinsic complex field in a pupil plane of the optics system, wherein the reconstruction algorithm uses N effective filters that have previously been extracted by an extraction algorithm that processes the single-shot irradiance pattern generated using the CGH to obtain the N effective filters.

11. The optics system of claim 10, further comprising adaptive optics (AOs) and wherein the reconstruction algorithm uses a complex conjugate of the retrieved estimated extrinsic complex field to perform correction of the AOs to compensate for extrinsic aberration in the optics system.

12. The optics system of claim 11, wherein the reconstruction algorithm when performed by the processor causes the optics system to at least:
   a) generate N individual pupil fields by multiplying a complex transmission of each effective filter by an estimate of an extrinsic phase distribution of the optics system;
   b) generate N complex fields on the pupil plane by performing a fast Fourier transform (FFT) algorithm on the N individual pupil fields;
   c) apply an amplitude constraint to the N complex fields by replacing amplitudes of the N complex fields with amplitudes of the N phasorgrams of the measured single-shot irradiance pattern without disturbing a phase distribution of the N complex fields;
   d) perform an inverse FFT algorithm on the amplitude-constrained N complex fields to propagate the amplitude-constrained N complex fields back to the pupil plane; and
   e) divide the amplitude-constrained N complex fields propagated back to the pupil plane by the N effective filters, respectively, to form N individual estimates of extrinsic phase of the optics system.

13. The optics system of claim 12, wherein performing the reconstruction algorithm further:
   f) calculates an error between the measured single-shot irradiance pattern and a synthetic single-shot irradiation pattern generated using the CGH; and
   g) determines whether or not the calculated error is less than a predetermined threshold (TH) value;
   wherein if a determination is made that the calculated error is not less than the predetermined TH value, a) through g) are reiterated; or
   if a determination is made that the calculated error is less than the predetermined TH value, averaging the N individual estimates of extrinsic phase to obtain a final estimate of the extrinsic phase of the optics system.

14. The optics system of claim 10, wherein the optics system is implemented in an augmented reality (AR) device.

15. The optics system of claim 10, wherein the optics system is implemented in a virtual reality (VR) device.

16. The optics system of claim 10, wherein the optics system is implemented in a mixed reality (MR) device.

17. A complex diversity computer program for performing phase retrieval in an optics system, the program comprising computer instructions for execution by a processor of the optics system, the computer instructions being embodied on a non-transitory computer-readable medium, wherein the optics system comprises a computer-generated hologram (CGH) configured to generate a single-shot irradiance pattern comprising N phasorgrams derived from a single image acquisition, where N is a positive integer that is greater than or equal to 2, the CGH having a design that is based on a preselected set of seed filters associated with an estimated extrinsic aberration in the optics system, an optical detector of the optics system being configured to measure the single-shot irradiance pattern, the computer instructions comprising:
   a reconstruction algorithm that retrieves an estimated extrinsic complex field in a pupil plane of the optics system by using N effective filters that have previously been extracted by an extraction algorithm that processes the single-shot irradiance pattern generated using the CGH to obtain the N effective filters.

18. The complex diversity computer program of claim 17, wherein the reconstruction algorithm comprises:
   a) a code segment for generating N individual pupil fields by multiplying a complex transmission of each effective filter by an estimate of an extrinsic phase distribution of the optics system;
   b) a code segment for generating N complex fields on the pupil plane by performing a fast Fourier transform (FFT) algorithm on the N individual pupil fields;
   c) a code segment for applying an amplitude constraint to the N complex fields by replacing amplitudes of the N complex fields with amplitudes of the N phasorgrams of the measured single-shot irradiance pattern without disturbing a phase distribution of the N complex fields;
   d) a code segment for performing an inverse FFT algorithm on the amplitude-constrained N complex fields to propagate the amplitude-constrained N complex fields back to the pupil plane;
   e) a code segment for dividing the amplitude-constrained N complex fields propagated back to the pupil plane by the N effective filters, respectively, to form N individual estimates of extrinsic phase of the optics system;
   f) a code segment that calculates an error between the measured single-shot irradiance pattern and a synthetic single-shot irradiation pattern generated using the CGH;
   g) a code segment that determines whether or not the calculated error is less than a predetermined threshold (TH) value;
   wherein if a determination is made by code segment g) that the calculated error is not less than the predetermined TH value, code segments a) through g) are reiterated; or
   if a determination is made by code segment g) that the calculated error is less than the predetermined TH value, a code segment h) averages the N individual estimates of extrinsic phase to obtain a final estimate of the extrinsic phase of the optics system.

* * * * *